United States Patent [19]

McCrae

[11] 3,929,794

[45] Dec. 30, 1975

[54] UNSYMMETRICAL BISAZOMETHINE METAL COMPLEX PIGMENTS

[75] Inventor: James McGeachie McCrae, Stewarton, Scotland

[73] Assignee: Ciba-Geigy Corporation, Ardsley, N.Y.

[22] Filed: Sept. 18, 1973

[21] Appl. No.: 398,528

[30] Foreign Application Priority Data
Sept. 20, 1972 United Kingdom............... 43451/72

[52] U.S. Cl. ................ 260/270; 106/292; 106/302; 106/304; 106/308; 260/39 P; 260/41 C; 260/299
[51] Int. Cl.²............... C07D 231/20; C07D 215/22
[58] Field of Search............................ 260/299, 270

[56] References Cited
UNITED STATES PATENTS

| 3,562,282 | 2/1971 | Klopping............................. | 260/299 |
| 3,576,012 | 4/1971 | Matlack............................... | 260/270 |
| 3,766,199 | 10/1973 | Dehnert et al...................... | 260/299 |
| 3,780,049 | 12/1973 | Hari et al............................ | 260/299 |

*Primary Examiner*—Richard J. Gallagher
*Attorney, Agent, or Firm*—Vincent J. Cavalieri

[57] ABSTRACT

Bisazomethine metal complexes of the formula

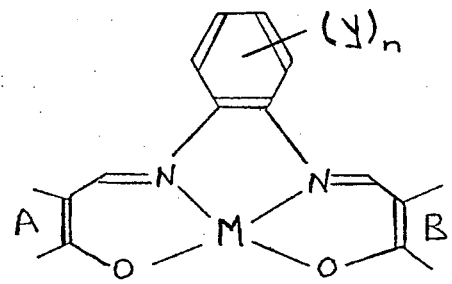

wherein $n$ is 1, 2, 3 or 4, M is a transition metal atom, Y is hydrogen or a non-water stabilising group, or when $n$ is 2, two Y substituents can form a carbocyclic ring, and A and B are either dissimilar heterocyclic residues or A is a heterocyclic residue and B is an arylene residue for coloring pastics and lacquers.

17 Claims, No Drawings

UNSYMMETRICAL BISAZOMETHINE METAL COMPLEX PIGMENTS

The present invention relates to new metallised bisazomethine compounds of value as pigments and new bisazomethines of use in the production of the metallised pigments.

The present invention provides a novel unsymmetrical compound of formula:

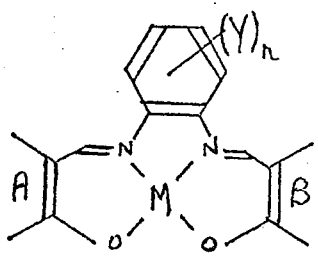

I wherein $n$ is 1, 2, 3 or 4, M is a transition metal atom, Y is hydrogen or a non-water-solubilising group, or when $n$ is 2, two Y substituents can form a carbocyclic ring and residues A and B are either dissimilar heterocyclic residues or A is a heterocyclic residue and B is an arylene residue.

When A is a heterocyclic residue and B is an arylene residue, B is preferably a phenylene or naphthylene residue, thus providing preferred compounds having the formula:

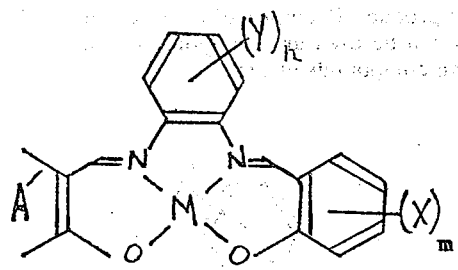

II in which Y, M and $n$ have their previous significance, X is the same as or different from Y and is hydrogen or a non-water-solubilising group, or when $n$ is 2, two X substituents and/or two Y substituents can form a carbocyclic ring, and $A^1$ is the residue of an o-hydroxy heterocyclic aldehyde, and $m$ is 1 to 4.

Examples of preferred o-hydroxy heterocyclic aldehyde precursors of residue A are pyrazolone aldehydes of formula

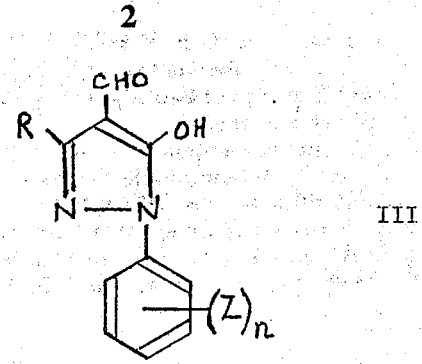

III wherein R and Z have the same significance as X or Y and n has its previous significance. Consequently, preferred sub-generic examples of compounds II are those having the formula:

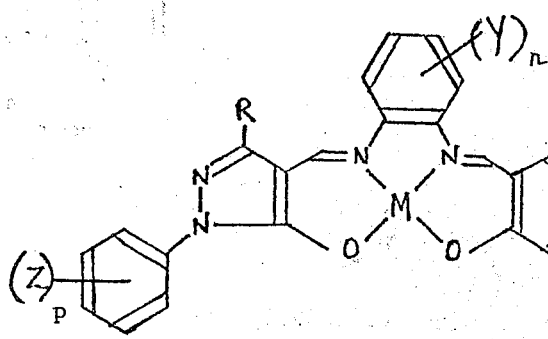

IV wherein X, Y, Z, R, M, $m$ and $n$ have their previous significance, and $p$ is 1 to 4.

Further instances of preferred o-hydroxy heterocyclic aldehyde precursors of residue A are hydroxyquinoline aldehydes of formula:

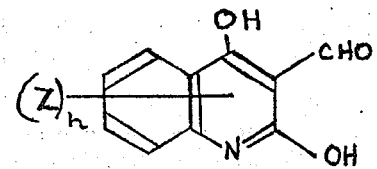

V wherein Z and $n$ have their previous significance. Consequently, further preferred sub-generic examples of compounds II are the corresponding bis-azomethines of formula:

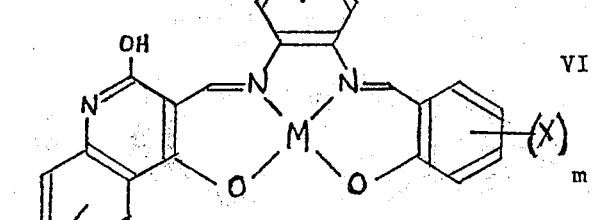

VI wherein M, n, m, X, p, Y and Z have their previous significance and wherein two adjacent X groups or two adjacent Y groups or two adjacent Z groups may form a fused arylene ring.

In the case of compounds in which A and B in formula I are both heterocyclic residues, then these are different either because A and B are unique of themselves or because, although they have the same heterocyclic nucleus, they bear different substituents. Examples of this type are compounds of formula:

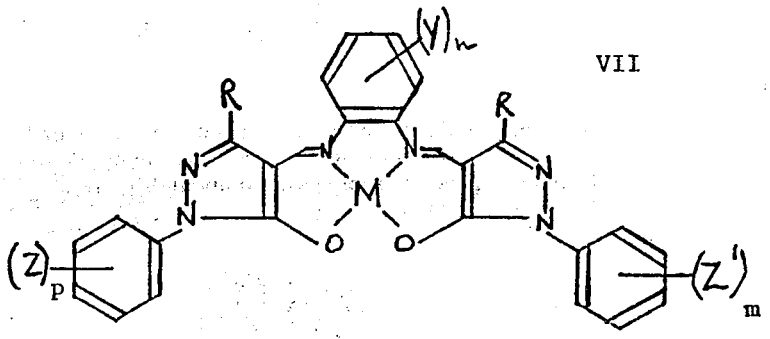

VII and

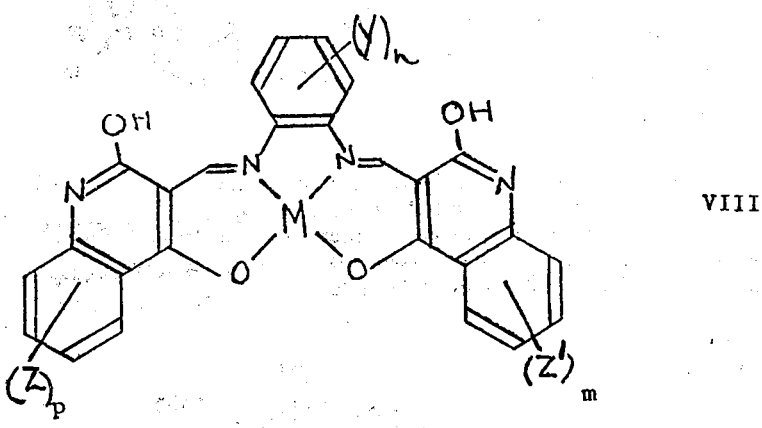

VIII wherein M, Y, Z, $m$, $n$ and $p$ have their previous significance and $Z^1$ has the same significance as Y but is different from Z.

Examples of transition metal atoms which may be present in the compound of formula I are iron, cobalt, manganese, chromium or vanadium, but preferably those metals of type $M^{II}$ which form four co-ordinate complexes are used. Especially preferred metals are zinc, copper and nickel.

the present invention provides a first process in which a compound of formula I is produced comprising reacting a compound having the formula:

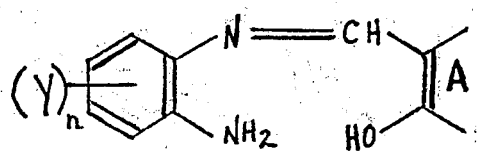

IX wherein A, Y and $n$ have their previous significance, with an o-hydroxy heterocyclic aldehyde of formula

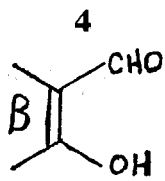

X wherein B has its previous significance and in which the previous restrictions concerning A and B being dissimilar types of heterocyclic residues hold and then metallising the product. Examples of heterocyclic aldehydes X which can be used are Compounds II and IV, thus producing compounds of type

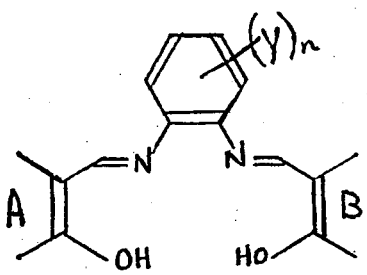

XI wherein A, B, Y and $n$ have their previous significance, and then metallising the product.

Alternatively, an o-hydroxyarylaldehyde of formula

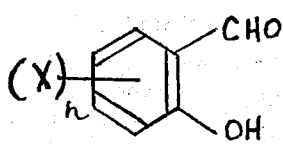

XII wherein X and n have their previous significance may be used in the first process of the invention to produce a compound of formula:

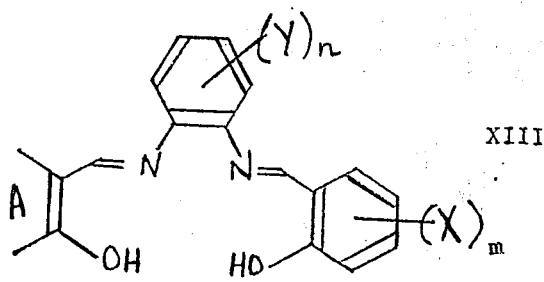

XIII wherein A, m, X, Y and n have their previous significance, and then metallising the reaction product.

The process can of course be modified by reacting a compound of formula:

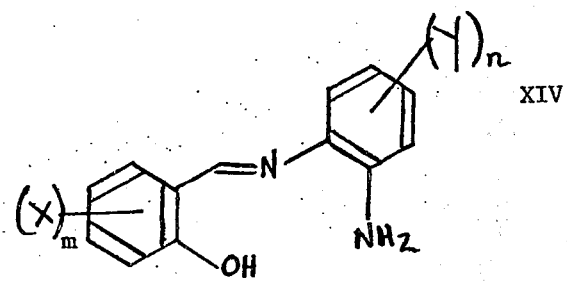

XIV wherein Y, Z, m and n have their previous significance with a compound of formula X and then metallising as before.

The present invention also includes mixtures of the unsymmetrical metal chelates of formula I with the corresponding symmetrical compounds. These mixtures can be produced, for example, by first preparing the unsymmetrical compounds as described above and then mixing these with the corresponding symmetrical compounds or they may be prepared directly by reacting a 1, 2 arylene diamine with a mixture of 2-hydroxy-1-aldehydes. The condensation reaction step of the reaction of compound IX and X or XII, or XIV and X may be effected in solution or in a finely-dispersed suspension with good agitation, using either water or an organic solvent as the reaction medium. The reaction is conveniently effected at an elevated temperature, usually between 50°C. and the temperature at which the mixture refluxes, depending upon the reactants and the solvent used. Preferably, the reaction is monitored to ensure that it is proceeding at a satisfactory rate, and that the end-product is not being rendered impure by side-reactions such as disproportionation.

Metallisation of the reaction products XI and XIII may be carried out in situ, or the ligand may be filtered off, washed and re-suspended in the same or a different solvent prior to metallisation. Metallisation may be effected using a solution of any suitable transition metal salt or complex. For coppering, an aqueous solution of copper acetate, cuprammonium sulphate or sodium cuprotartrate can be used. In the case of metallisation with zinc, an alcoholic solution of zinc acetate can be used. When metallisation is effected using nickel, it is convenient to use a solution of nickel acetate tetrahydrate in dimethyl formamide.

The compounds of formula IX are new and form part of this invention. This compound may be produced by reacting together the corresponding o-hydroxy aldehyde and O-arylene diamine in solution or as a finely-dispersed suspension, with efficient agitation, in either water or an organic solvent at a reaction temperature below 75°C, preferably at ambient temperature, for sufficient time to enable the reaction to go to completion. The time for completion of the reaction varies from 30 minutes to 7 hours depending upon the nature of the reactants and the conditions employed. It is particularly convenient to carry out the reaction in an aqueous suspension or solution at pH between 6-9 in the presence of a mild reducing agent such as sodium bisulphite for instance in the ratio of 2 mols. of bisulphite to 1 mol. of aldehyde. In this way, the reaction is facilitated and contamination of the product with oxidation products, which would have a deleterious effect on the brightness and other physical properties of the product is avoided. Small amounts, that is less than 3% by weight of the calculated weight of the product of a surfactant anionic, nonionic or cationic may be added with advantage when working in an aqueous medium.

Although a variety of organic solvents, for instance alcohols, ketones, esters or hydrocarbons, may be employed instead of water as the reaction medium, this is less preferred because disproportionation to a mixture of bisazomethine and free o-arylene diamine can occur in organic solvents.

Disproportionation may also occur on heating a solution or suspension of a compound of formula-XIV or IX or on drying or storing these compounds. For this reason it is particularly advantageous to react them directly with compounds of formula X or XII respectively without any further treatment other than filtration and washing.

The compounds of formula XI and XIII are also new, and these compounds too form part of this invention.

The compounds of formula I may be employed as pigments directly after production, according to the process of this invention, that is after they have been filtered off from their reaction mixture and dried. Alternatively, they may be first further processed using known wet or dry conditioning techniques such as grinding either alone or in the presence of a water-soluble salt or other medium which can subsequently be removed, for instance by washing.

Because of their economical and simple mode of production, combined with their excellent pigmentary properties, the compounds of formula I are valuable as pigments in a wide variety or organic media, for example surface coatings, inks and polymers, paints and plastics.

Accordingly, the present invention also provides a method of colouring organic material comprising incorporating into the organic material a minor proportion of a compound of formula I.

The compounds of formula I are valuable pigments with high fastness properties and many of them, especially the copper and nickel complexes, have a sufficient degree of durability to enable them to be used effectively in automotive lacquers.

Some Examples will now be given. Parts and percentages are by weight unless otherwise stated.

EXAMPLE 1

20.8 parts of 2-hydroxy-3-carboxy-1-naphthaldehyde dissolved in 500 parts of ethanol were added dropwise over 15 minutes to a solution of 14.7 parts of 3,4-diamino-nitrobenzene in 500 parts of ethanol. After being stirred for 1½ hours, the cold, bright-red suspension was filtered, washed to a clean bleed with ethanol, and sucked down to give a presscake containing 29 parts (85%) of a red solid of melting point 227°–37°C. (decomp.) having the formula:

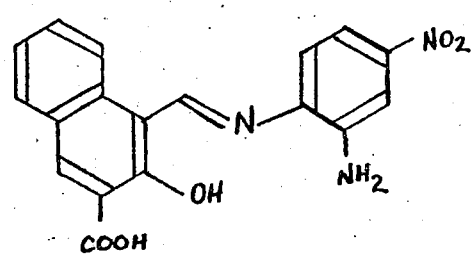

EXAMPLE 2

43 parts of 2-hydroxy-1-naphthaldehyde, 39 parts of 3,4-diamino-nitrobenzene and 1 part of a commercial nonionic surfactant were stirred for 15 minutes in 1,000 parts of water giving a red-brown suspension. 10 parts of sodium hydroxide dissolved in 200 parts of water were added giving a brown suspension. 38 parts of sodium bisulphite were added and the suspension heated on the steam-bath at 75°C. for 7 hours, when the orange-brown suspension was filtered, washed with cold water until free of bisulphite and dried, giving 68 parts (88%) of an orange brown solid of melting point 203°–8°C. and having the formula:

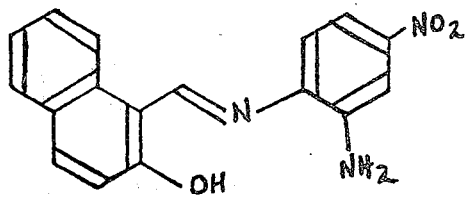

TABLE I

| Example | Diamine | O-Hydroxy Aldehyde | Product | Colour | Yield | mpt °C |
| --- | --- | --- | --- | --- | --- | --- |
| 3 | | | | Yellow | 73 | 187 |
| 4 | | | | Yellow | 75 | 210 |
| 5 | | | | Orange | 84 | 165-8 |
| 6 | | | | Yellow | 83 | |

TABLE II

| Example | Azomethine | O-Hydroxy Aldehyde | Product | Colour | Yield | mph °C |
| --- | --- | --- | --- | --- | --- | --- |
| 7 | | | | Yellow | 80 | 175–195 (dec) |
| 8 | | | | Yellow | 83 | 140–143 |
| 9 | | | | Yellow | 81 | 174–176 |

TABLE II—Continued

| Example | Azomethine | O-Hydroxy Aldehyde | Product | Colour | Yield | mph °C |
|---|---|---|---|---|---|---|
| 10 | | | | Orange | 82 | 231 (dice) |
| 11 | | | | Red | 82 | 220-24 |
| 12 | | | | Red | 93 | 248 |
| 13 | | | | Yellow | 73 | 149 150 |
| 14 | | | | Orange | 69 | 260 |
| 15 | | | | Orange | 85 | 131-44 (dice) |
| 16 | | | | Brown | 48 | 163-78 (decomp) |
| 17 | | | | Orange | 90 | 234-72 |
| 18 | | | | Yellow | 93 | 238-40 |
| 19 | | | | Yellow | 87 | 225-9 |
| 20 | | | | Yellow | 84 | 212-17 |

TABLE II—Continued

| Example | Azomethine | O-Hydroxy Aldehyde | Product | Colour | Yield | mph °C |
|---|---|---|---|---|---|---|
| 21 | | | | Yellow | 77 | 217-22 |
| 22 | | | | Brown | 49 | 260-70 |
| 23 | | | | Yellow | 33 | 265-75 (chan) |
| 24 | | | | Brown | 60 | 277-28 |

EXAMPLE 25

2.3 parts of the product of Example 8 were stirred in 46.5 parts of methyl Cellosolve. (Cellosolve is a Trade Mark). To this was added 1 part of cupric acetate monohydrate dissolved in 9.5 parts of dimethyl formamide at the boil and the resultant mixture refluxed for 6.5 hours, filtered hot, and the solid washed with methyl cellosolve followed by ethanol and dried, to give 23 parts (89%) of a yellow brown solid of melting point 285°–8°C.

EXAMPLE 26

2.4 parts of the product of Example 9 were stirred in 46.5 parts of methyl Cellosolve. To this were added 1.3 parts of nickel acetate tetrahydrate in 19 parts of hot methyl Cellosolve and the resultant mixture refluxed for 6.5 hours to give an orange-red suspension which was filtered hot and the solid washed with methyl cellosolve followed by ethanol to give 2.3 parts (87%) of an orange-red solid of melting point not less than 300°C.

EXAMPLES 27 to 66

Various ligands were metallised using one of the procedures described in Examples 25 and 26.
The structures and properties of the products so obtained are summarised in the following Table III.

TABLE III

| Example | Ligand | Product | Colour In Lacquer | % Yield | Fastness To Light |
|---|---|---|---|---|---|
| 27 | | | Golden brown | 90 | Excellent |
| 28 | | | Red | 57 | Excellent |
| 29 | | | Orange-red | 95 | Excellent |
| 30 | | | Golden brown | 92 | |

TABLE III—Continued

| Example | Ligand | Product | Colour In Lacquer | % Yield | Fastness To Light |
|---|---|---|---|---|---|
| 31 | | (structure) | Yellow | 71 | Good |
| 32 | (structure) | (structure) | Orange | 78 | Excellent |
| 33 | (structure) | (structure) | Orange-red | 81 | Excellent |
| 34 | " | (structure) | Orange Yellow | 80 | " |
| 35 | " | (structure) | Yellow | 67 | Good |
| 36 | (structure) | (structure) | Brown | 82 | Good |
| 37 | (structure) | (structure) | Golden Yellow | 84 | Excellent |
| 38 | | (structure) | Orange yellow | 78 | Good |
| 39 | (structure) | (structure) | Golden yellow | 82 | Excellent |
| 40 | | (structure) | Yellow | 75 | Good |
| 41 | (structure) | (structure) | Orange | 88 | Excellent |
| 42 | " | (structure) | Yellow | 79 | " |

TABLE III—Continued

| Example | Ligand | Product | Colour in Lacquer | % Yield | Fastness To Light |
|---|---|---|---|---|---|
| 43 | " | (structure) | Yellow | 6 | Good |
| 44 | (structure) | (structure) | Golden brown | 88 | Excellent |
| 45 | (structure) | (structure) | Orange | 77 | Excellent |
| 46 | " | (structure) | Orange-yellow | 84 | " |
| 47 | " | (structure) | Yellow | 73 | Good |
| 48 | (structure) | (structure) | Yellow | 95 | Excellent |
| 49 | (structure) | (structure) | Yellow | 93 | Excellent |
| 50 | " | (structure) | Yellow | 92 | Good |
| 51 | (structure) | (structure) | Yellow | 98 | Excellent |
| 52 | " | (structure) | Yellow | 98 | Excellent |
| 53 | (structure) | (structure) | yellow | 99 | Good |
| 54 | (structure) | (structure) | yellowish brown | 90 | Excellent |

TABLE III—Continued
| Example | Ligand | Product | Colour In Lacquer | % Yield | Fastness To Light |
|---|---|---|---|---|---|
| 55 | | 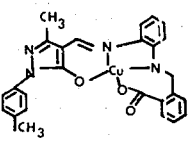 | yellow | 84 | Excellent |
| 56 | | 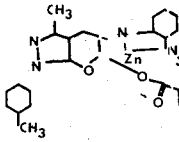 | yellow | 96 | Good |
| 57 | 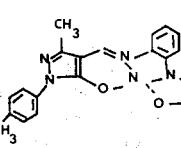 | 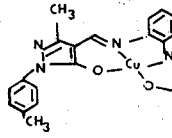 | yellow | 96 | Excellent |
| 58 | | 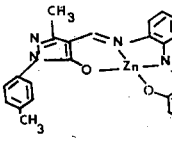 | yellow | 96 | Excellent |
| 59 | | 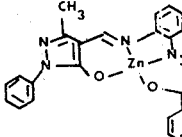 | yellow | 91 | Good |
| 60 | 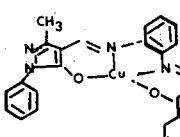 | 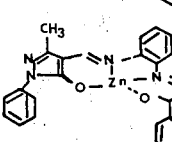 | yellow | 78 | Excellent |
| 61 | 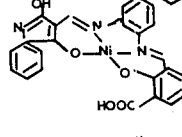 | 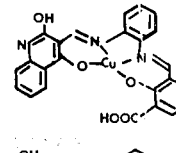 | Yellow | 88 | Excellent |
| 62 | | 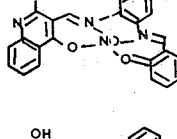 | Yellow | 69 | Good |
| 63 | 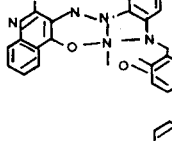 | | Yellow | 94 | Excellent |
| 64 | | | Orange | 82 | Excellent |
| 65 | | | Yellow | 56 | Excellent |
| 66 | | | Brown | 37 | Excellent |

EXAMPLE 67

8.6 parts of 2-hydroxy-1-naphthaldehyde dissolved in 80 parts of ethanol were added to 7.13 parts of 3,4-diamino-chlorobenzene dissolved in 80 parts of ethanol and the mixture stirred for 1 hour. A solution of 10.1 parts of 1-phenyl-3-methyl-4-formyl-pyrazol-5-one in 80 parts of ethanol was added giving an orange-yellow suspension which was refluxed for 4 hours, filtered hot, washed with ethanol and dried to give 19.2 parts (80%) of an orange-yellow solid, melting point 175°–95°C.-(decomp.) and having the formula:

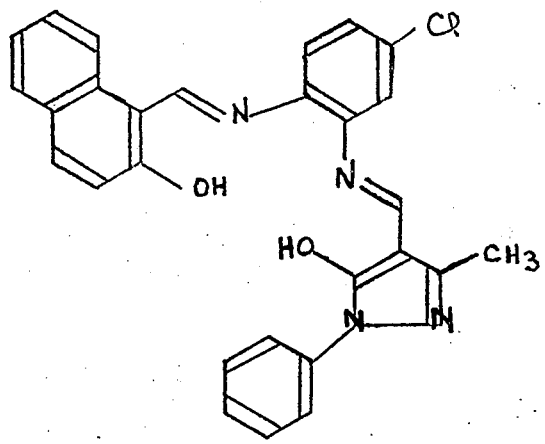

EXAMPLE 68

5.8 parts of N(2-hydroxy-1-naphthylidene)-2-amino-4-methyl aniline as a paste in ethanol, prepared by a similar method to that used in Example 1, were mixed with a suspension of 4.2 parts of 1-phenyl-3-methyl-4-formyl-pyrazol-5-one, and the mixture refluxed for 4 hours, filtered hot, and the solid washed with ethanol and dried to give 8.0 parts (83%) of a yellow solid of melting point 140°–43°C. and having the formula:

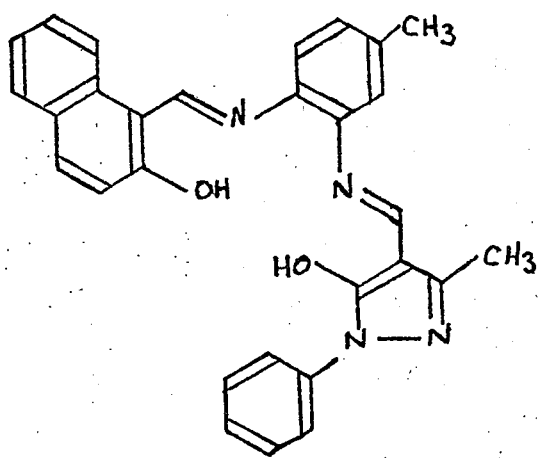

EXAMPLE 69

5.05 parts of 1-phenyl-3-methyl-4-formyl pyrazol-5one, -one, parts of 5-bromo salicyaldehyde and 2.7 parts of o-phenylene diamine were stirred in 89 parts of ethanol for 15 minutes and then refluxed with stirring for 7 hours. The resultant yellow suspension was filtered, the solid washed with ethanol and dried. Thus were obtained 8.6 parts of a yellow solid of melting point 201°–204°C.

3.8 parts of the above product were heated to reflux in 72 parts of methyl cellosolve. 1.6 parts of cupric acetate monohydrate dissolved in 24 parts of hot dimethylformamide were added and the resultant dark green suspension was refluxed for 6 hours, allowed to cool, and the solid filtered off, washed with methyl cellosolve followed by ethanol and dried. Thus were obtained 3.1 parts of a brown solid of melting point not less than 300°C.

EXAMPLE 70

5 parts of the product of Example 32 were mixed with 5 parts of the corresponding symmetrical compound, namely N,N'-bis(2-hydroxy-1-naphthylidine)-2,4-diamino toluene nickel II giving an orange brown powder of melting point not less than 300°C.

EXAMPLE 71

2.5 parts of N,N'-bis(2-hydroxy-1-naphthylidene)-1,2-diaminobenzene and 1.78 parts of the product of Example 8 were stirred in 19 parts of methyl cellosolve and the suspension heated. 2.74 parts of nickel acetate tetrahydrate were suspended in 19 parts of hot methyl cellosolve and added to the above suspension. The resulting orange brown suspension was refluxed for 4 hours, the solid filtered off and washed with methyl cellosolve followed by ethanol and dried. Thus were obtained 4.6 parts of an orange red solid of melting point not less than 300°C.

EXAMPLE 72

60 parts of the product of Example 25 were ball milled with 138 parts of "Epok U9193" which is a solution of an unmodified butylated melamine/formaldehyde resin in n-butanol and 452 parts of xylol. 350 parts of "Epok D2103" which is a solution of a hydroxy acrylic resin, a 1:1 mixture of xylene and n-butanol, were added gradually and ball milling continued. The resulting mixture had a pigment to binder ratio of 1:5; this was adjusted to 1:10 by the addition of more resin solution and the paint was thinned to the required viscosity for spraying. Aluminum panels were sprayed and then stoved at 120°C for 30 minutes. The resulting paint films had excellent fastness to light, heat and acids; for example, spotting the panels with 0.1 N hydrochloric acid left no discolouration after drying, and stoving the panels at 180°C for 30 minutes had practically no detectable effect on the colour. The resulting coated panels were a very attractive transparent golden yellow colour and could be oversprayed with for example, a white paint of the same type without the yellow colour bleeding into and thus spoiling the new white finish.

When the stainer (with a 1:5 pigment to binder ratio) whose preparation is described above was combined with a suitable paste of finely powdered aluminum to give a pigment to aluminum ration of 75:25 and the mixture was again thinned to a suitable viscosity for spraying, very attractive golden brown metallic coatings were obtained which also had excellent fastness properties.

In the same way by replacing the product of Example 25 with the products of any of the Examples 26–69, there could be obtained paint films having varying shades of yellow to red. All were however, characterised by having the same excellent fastness properties.

I claim:
1. A compound of the formula

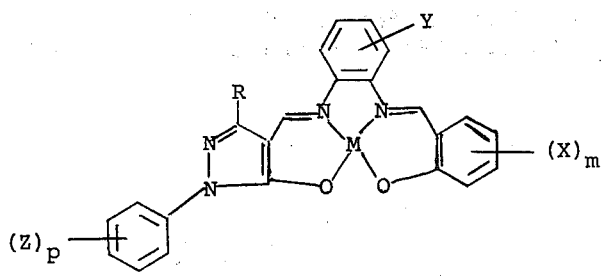

or

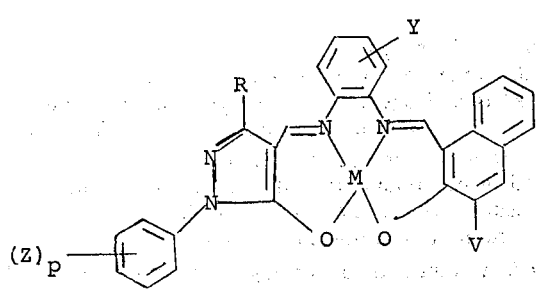

wherein Y is hydrogen, nitro, methyl or chloro; M is a transition metal atom; X is hydrogen, nitro, methyl, chloro or hydroxy; $m$ is an integer of 1 to 4; Z is hydrogen, nitro, methyl, chloro or hydroxy; $p$ is an integer of 1 to 4; R is hydrogen, nitro, methyl, chloro or hydroxy; and V is hydrogen or carboxy.

2. A compound according to claim 1 wherein the transition metal atom is a metal of the type $M^{II}$ capable of forming four co-ordinate complexes.

3. A compound according to claim 1 wherein the metal is zinc, copper or nickel.

4. The compound according to claim 1 of the formula

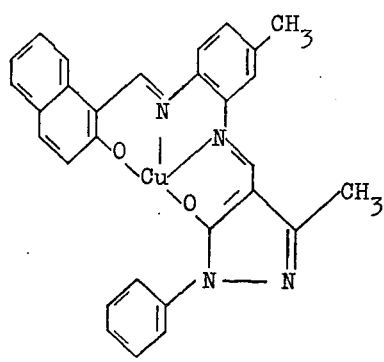

5. The compound according to claim 1 of the formula

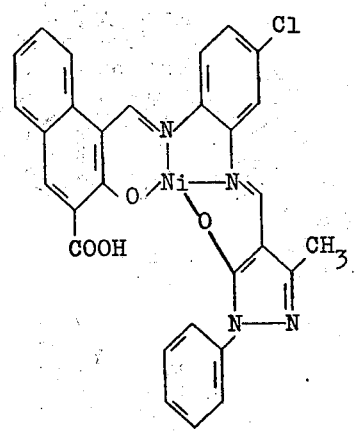

6. The compound according to claim 1 of the formula

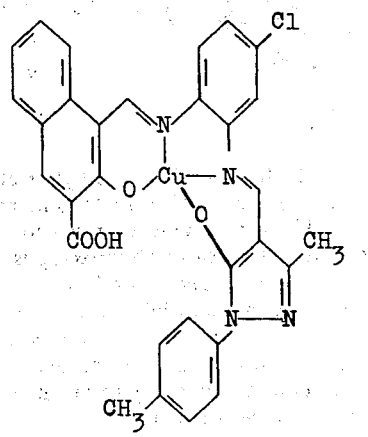

7. The compound according to claim 1 of the formula

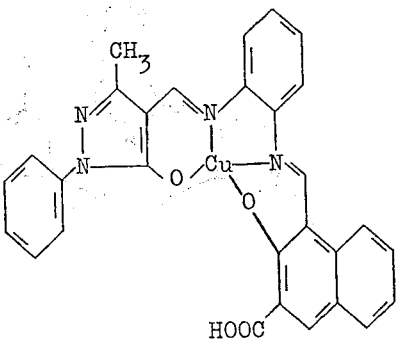

8. The compound according to claim 1 of the formula

9. A compound of the formula

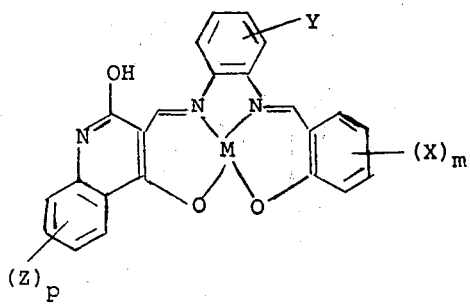

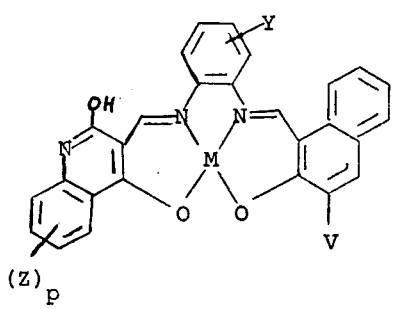

wherein Y is hydrogen, nitro, methyl or chloro; M is a transition metal atom; $Z^1$ is hydrogen, nitro, methyl, chloro or hydroxy; m is an integer of 1 to 4; X is hydrogen, nitro, methyl, chloro or hydroxy; p is an integer of 1 to 4; and V is hydrogen or carboxy.

10. A compound according to claim 9 wherein the transition metal atom is a metal of the type $M^{II}$ capable of forming four co-ordinate complexes.

11. A compound according to claim 9 wherein the metal is zinc, copper or nickel.

12. A compound of the formula

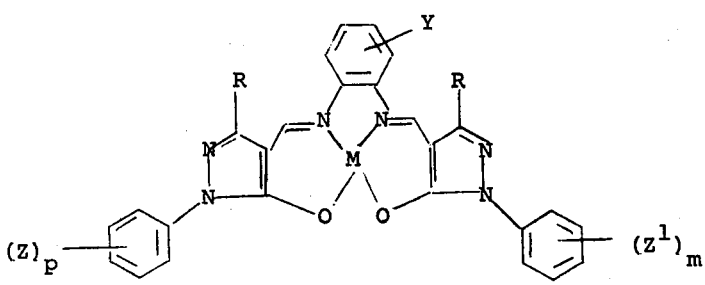

wherein Y is hydrogen, nitro, methyl or chloro; M is a transition metal atom; Z is hydrogen, nitro, methyl, chloro or hydroxy; p is an integer of 1 to 4; $Z^1$ is hydrogen, nitro, methyl or chloro and is different from Z; m is an integer of 1 to 4; and R is hydrogen, nitro, methyl, chloro or hydroxy.

13. A compound according to claim 12 wherein the transition metal atom is a metal of the type $M^{II}$ capable of forming four co-ordinate complexes.

14. A compound according to claim 12 wherein the metal is zinc, copper or nickel.

15. A compound of the formula

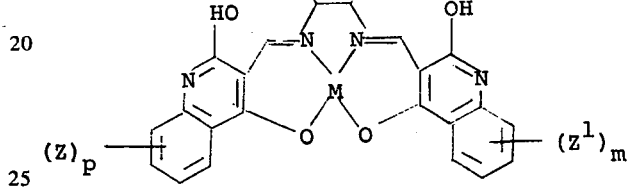

wherein Y is hydrogen, nitro, methyl or chloro; Z is hydrogen, nitro, methyl or chloro; p is an integer of 1 to 4; $Z^1$ is hydrogen, nitro, methyl or chloro; and $Z^1$ is hydrogen, nitro, methyl or chloro and is different from Z; and n is an integer of 1 to 4.

16. A compound according to claim 15 wherein the transition metal atom is a metal of the type $M^{II}$ capable of forming four co-ordinate complexes.

17. A compound according to claim 15 wherein the metal is zinc, copper or nickel.

* * * * *